United States Patent [19]
Ketler, Jr.

[11] 3,907,596
[45] Sept. 23, 1975

[54] SEA WATER BATTERY

[75] Inventor: Albert E. Ketler, Jr., Blairsville, Pa.

[73] Assignee: Ocean Energy, Inc., Blairsville, Pa.

[22] Filed: July 1, 1974

[21] Appl. No.: 484,805

Related U.S. Application Data

[63] Continuation of Ser. No. 248,772, April 28, 1972, abandoned, which is a continuation of Ser. No. 60,428, Aug. 3, 1970, abandoned.

[52] U.S. Cl. .......................................... 136/100 R
[51] Int. Cl. .......................................... H01m 17/02
[58] Field of Search ................ 136/100, 74, 83, 120

[56] References Cited
UNITED STATES PATENTS

| | | | |
|---|---|---|---|
| 3,156,586 | 11/1964 | Solomon et al. | 136/100 R |
| 3,266,936 | 8/1966 | Krebs | 136/74 X |
| 3,281,271 | 10/1966 | Comanor et al. | 136/100 M X |
| 3,401,063 | 9/1968 | Opitz | 136/100 R |
| 3,427,201 | 2/1969 | Burant et al. | 136/100 R |
| 3,451,855 | 6/1969 | Jones et al. | 136/100 R X |
| 3,466,193 | 9/1969 | Hughel | 136/26 |
| 3,497,393 | 2/1970 | Dreisbach et al. | 136/100 R |
| 3,674,564 | 7/1972 | Ketler, Jr. | 136/100 R |

*Primary Examiner*—Howard S. Williams
*Assistant Examiner*—C. F. LeFevour
*Attorney, Agent, or Firm*—Parmelee, Miller, Welsh & Kratz

[57] ABSTRACT

A novel battery using sea water as an electrolyte generates power from the galvanic corrosion of a cathode material.

7 Claims, 6 Drawing Figures

INVENTOR.
ALBERT E. KETLER
BY
Michael B. Fein
ATTORNEY

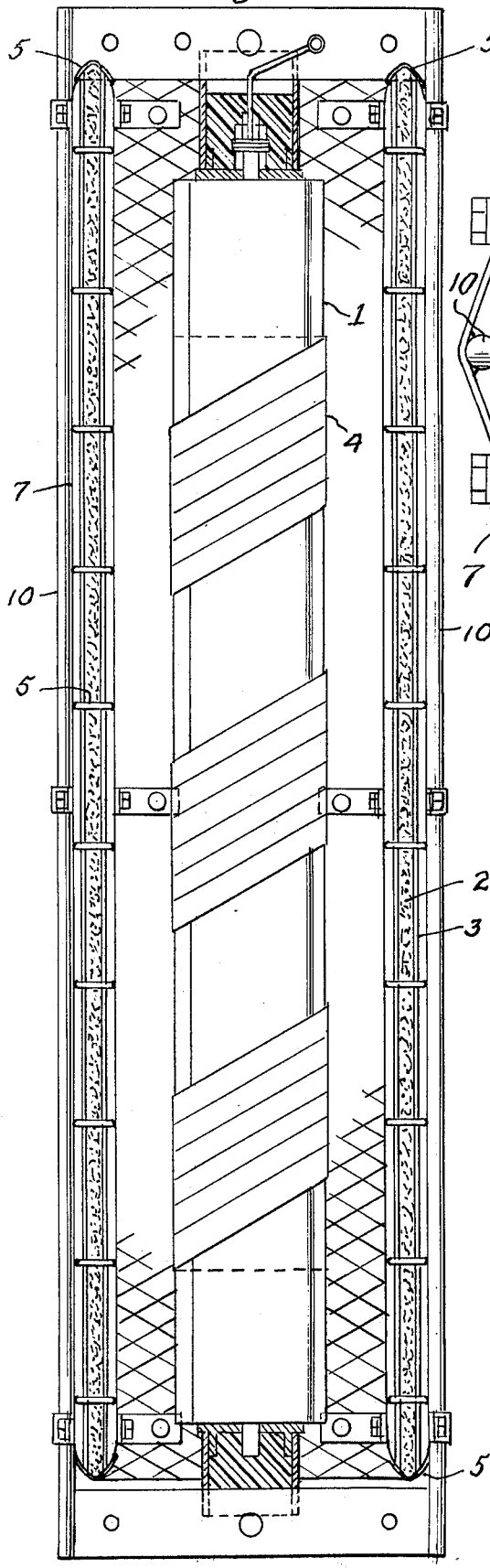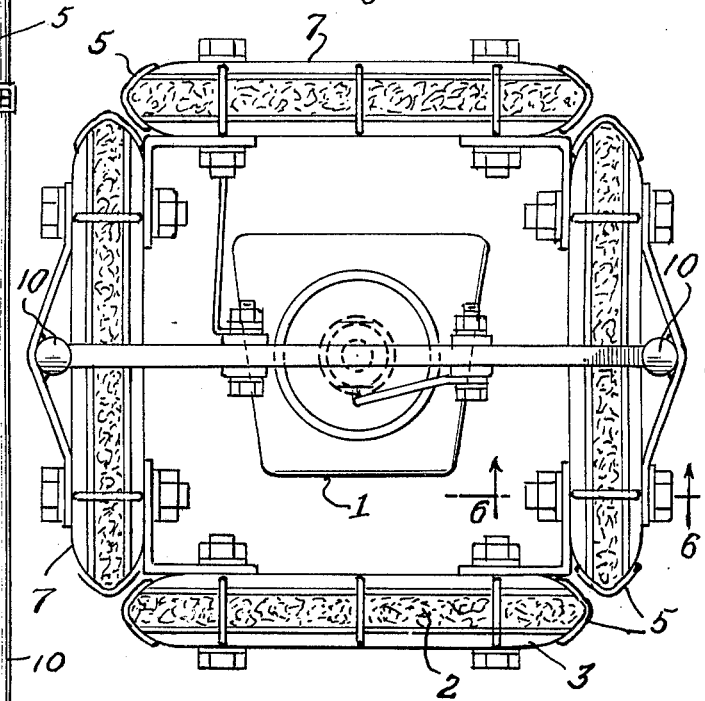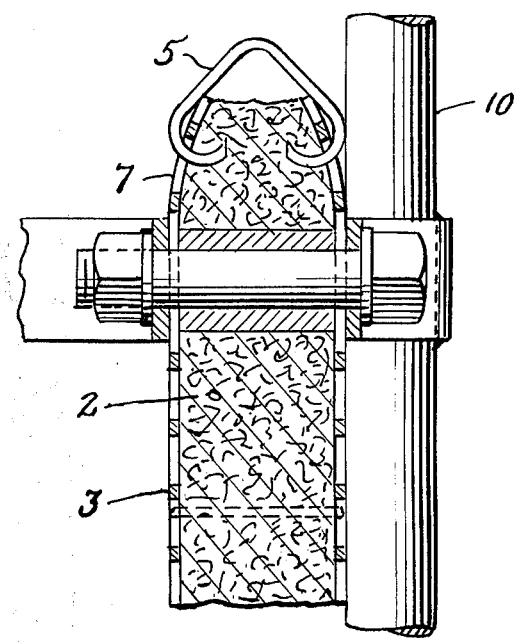

3,907,596

SEA WATER BATTERY

This is a continuation of application Ser. No. 248,772, filed Apr. 28, 1972 now abandoned and thus also of abandoned application Ser. No. 60,428, filed Aug. 3, 1970.

BACKGROUND OF THE INVENTION

This invention relates to primary cells for conversion of chemical energy to electrical energy, and more specifically to a novel sea water battery of improved design.

The closest prior art devices are exemplified by Opitz, U.S. Pat. No. 3,401,063, Sept. 10, 1968 and consist of annular metal baskets containing steel wool with an elongated metal anode of cylindrical configuration positioned in the central cavity. Problems with these devices of the prior art are that there is insufficient sea water circulation which slows down the corrosion process and lowers the available voltages, as well as the problem of precipitates and debris accumulating in the basket. The lack of circulation of sea water prevents the washing away of this accumulated debris, lowering the efficiency of the cell.

SUMMARY OF THE INVENTION

It is therefore an object to provide a sea water battery which is free of the disadvantages of similar prior art devices.

It is a further object to provide a lightweight source of electrical energy having long life and high efficiency.

It is a still further object to provide apparatus for generating electrical power employing sea water as an electrolyte which does not become fouled by debris.

It is a still further object to provide a more dependable sea water battery which maintains a substantially constant power output over its entire life.

These and other objects as will become apparent are accomplished by providing a battery comprising thin sections of metal wool held under high contact pressure by a conducting metal, said sections electrically connected to each other to form a cathode, and a dissimilar metal anode between two or more of said cathode sections.

BRIEF DESCRIPTION OF DRAWINGS

FIG. 4 is a front elevational view of another form of the invention with the front grid omitted for the sake of clarity;

FIG. 5 is a plan view of FIG. 4 drawn on a somewhat enlarged scale; and

FIG. 6 is a fragmentary section taken on the line 6—6 of FIG. 5 and drawn on a still larger scale.

DETAILED DESCRIPTION OF THE INVENTION AND DRAWINGS

Figure 1:
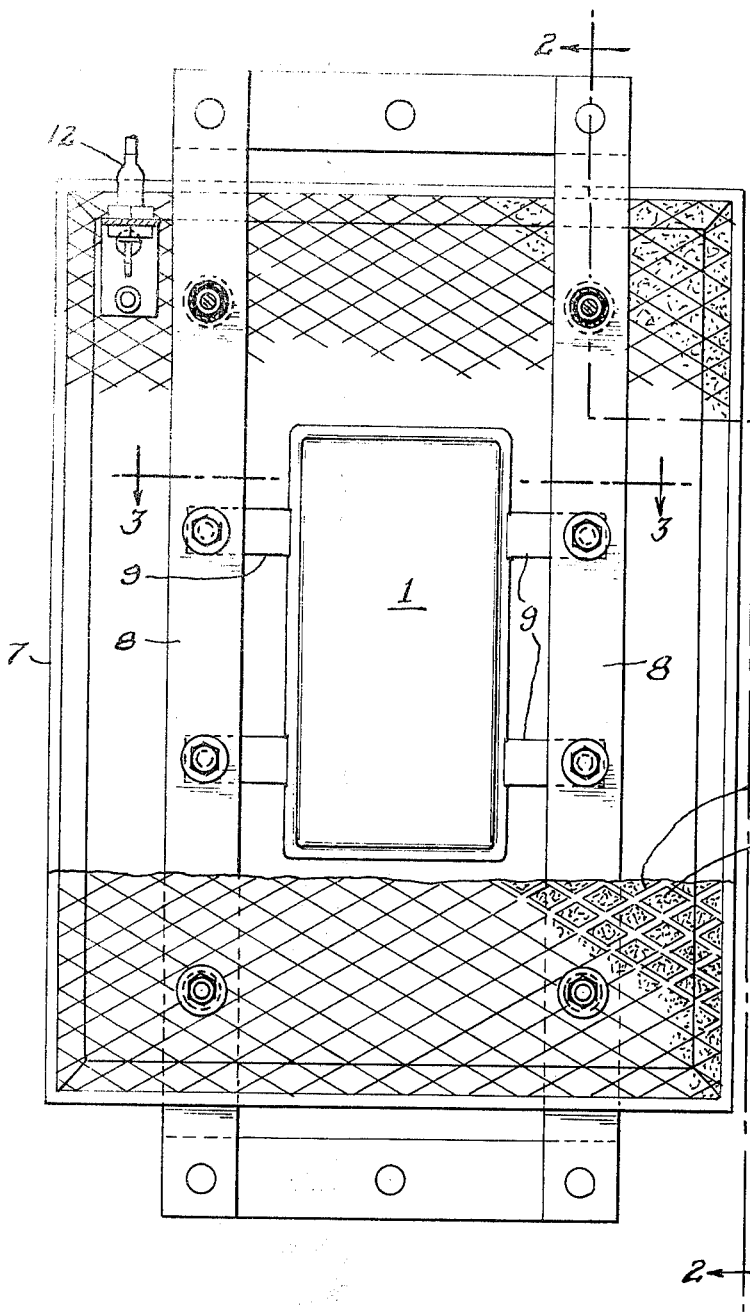
FIG. 1 is a front elevational view with a portion of the front grid broken away the view being taken along the line 1—1 in FIG. 2.

Referring to FIG. 1, the cell includes thin, high contact pressure cathodes comprising steel wool fibers 2 held in place between electrically conducting support grids 3. Other metal fibers may be substituted for the preferred steel, and the grid is preferably of steel. Bolts, rivets, or any other means of maintaining the high contact pressure between the grid 3 and the metal fiber 2 are used to increase the electrical conductivity, which creates an especial advantage over the prior art "basket" cathodes. Preferred are "pig-ring" fasteners 5 for clamping the fiber 2 in place. The cathode grid 7 has substantially flat surfaces parallel to the anode 1 surfaces hereinafter described so as to provide low internal electrical resistance in the device. One very suitable cathode arrangement is to provide four cathode grids disposed at right angles with respect to the adjacent grids so as to form a box-like arrangement with open top and bottoms, as shown in FIG. 5. The use of high density of steel fibers provides low electrical loss between contacting fibers and is an advantage over the loosely packed baskets in prior art devices.

A generally flat anode 1 is mounted between the above described cathode grids 7. The anode is preferably of substantially square-like cross-section when the cathode is of the box-like design as illustrated in FIG. 5 as previously described. The preferred anode metal is magnesium, due to its availability and workability, but use of this metal is not critical. The anode metal is selected so as to be dissimilar from the cathode metal and so as to create an electric potential in sea water electrolyte. A novel feature is the use of helically-wound insulation masking 4 in FIG. 4 of the anode for extended life operation, in the preferred embodiment. Said insulation 4 may be masking tape, electrical insulation tape, or any other insulating material which is easily applied and not destroyed or affected by sea water. In the preferred embodiment, 80 percent of the anode is masked. This barber-pole winding 4 serves to slow down the corrosion of the anode.

The anode 1 is, of course, mounted so as to be electrically insulated from the cathode 7, for example by means of non-conducting strap 8 and lug 9 arrangement as shown in FIG. 1, or supporting rod 10 arrangement as shown in FIG. 5.

Figure 2:
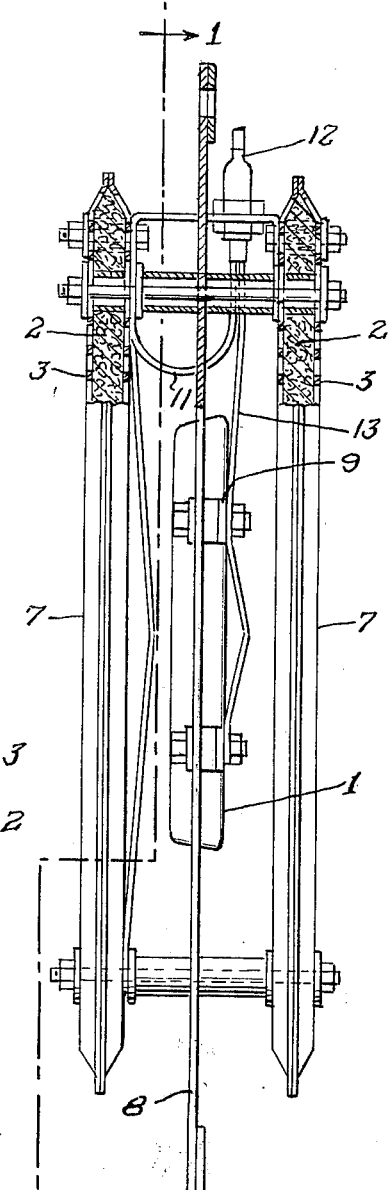
FIG. 2 is an end view partly in section taken as indicative by the line 2—2 in FIG. 1.

Electrical connections to the anode and cathode are shown in FIG. 2 wherein socket 12 is the terminal for cathode connection 11 and anode connection 13 secured respectively to the anode and cathode by any conventional means.

The two conductors may be connected to any suitable load, such as a converter which lowers or raises the voltage or changes it to alternating current, if desired, so as to operate lights, radio beacons, communication equipment, or other devices as desired.

A cell having a generally rectangular magnesium anode approximately four inches on a side by thirty-seven inches long surrounded by four thin high contact pressure steel wool grid cathodes performed at a higher energy level when immersed in sea water than any of the known prior art devices. This cell, when immersed in sea water, will produce useful long term output voltages in the range of 0.2 to 0.7 volts for periods up to an estimated 1.5 to 2 years. Cells with total energy capacity levels 233 233 watt hours per pound of magnesium consumed may be constructed and give a reasonably steady power output for from six months to two years.

Higher power levels are obtainable by increasing the size of the anode and cathodes.

Since the cell is open to circulation of sea water it needs no pressure case or enclosure of any kind.

The cell is designed to avoid the problems of prior art devices such as those of Opitz, supra, which included the fouling or clogging problems associated with insufficient circulation of sea water to permit washing away of debris.

It is to be understood that the specific embodiment herein described is merely illustrative and various modifications, alterations and substitutions are included in the invention without departing from its spirit and scope as defined in the appended claims.

Figure 3:
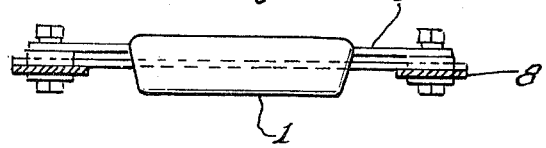
FIG. 3 is a plan section taken on the line 3—3 of FIG. 1.

In both embodiments showing galvanic batteries constructed in accordance with the invention, metal anode means 1 is provided which, in the embodiment of FIG. 1 to 3, has a pair of vertically elongated, substantially planar, opposed, wide face portions. Each of the pairs of cathodes 7 has a pair of inner and outer, vertically elongated, substantially planar, wide face, grid-like or expanded metal portions 3 with metal wool 2 securely interposed therebetween under high contact pressure. As shown in both embodiments, the anode means 1 is in a centrally disposed and substantially uniform spaced-apart relationship with respect to the electrodes 7, and has its wide face portions in an opposed and spaced-apart relation with wide face portions of the cathodes 7. The cathodes 7, as shown particularly in FIGS. 2 and 6, are electrically connected together, either by bolt and sleeve means or by angle members, in a spaced relation about centrally positioned anode means 1 and, in the embodiment of FIG. 6, define a box-like enclosure. As also shown particularly in FIGS. 2 and 6, the anode means 1 is securely positioned between and within the spacing between the cathodes 7 by crossextending arms means, such as shown in FIG. 6, or by crossextending lug means 9 secured to strap means 8, such as shown in FIGS. 1 to 3. Importantly, the construction is such that both the upper and lower vertical end portions of the vertically elongated battery elements are substantially fully open to the spacing between the anode means and the cathodes, see FIGS. 2 and 6. This enables a flushing through circulation or movement of the saline solution and minimizes clogging difficulties which have been encountered in connection with previous constructions.

I claim:

1. A galvanic battery for immersion usage in a saline water solution which comprises, metal anode means, at least a pair of cathodes of a different metal than said anode means, each of said cathodes having a pair of opposed inner and outer vertically elongated substantially planar wide face grid-like metal portions in high pressure contact with metal wool securely interposed therebetween, said anode means having at least a pair of vertically elongated substantially planar opposed wide face portions, said cathodes having their inner wide face portions in a spaced-apart and opposed relation with respect to each other on opposite sides of and in a substantially uniform spaced-apart relation with the pair of wide face portions of said anode means, means extending across between said pair of cathodes for securing said anode means in the above defined positioning and in an electrically insulated relationship with respect to said cathodes, and said anode means and said cathodes defining in their mounted relationship with respect to each other upper and lower vertical end portions that are substantially fully open to the spacing between the planar face portions of said anode means and said cathodes for circulation of the saline solution therethrough.

2. A galvanic battery as defined in claim 1 wherein said anode means has barber pole-like insulation masking wound in a vertically extending relation therealong that defines a spiral exposed metal area therealong.

3. A battery as defined in claim 1 wherein ring means is employed to engage within open portions of the pair of the planar face grid-like portions of each of said electrodes for clamping them together against the metal wool therebetween.

4. A battery as defined in claim 1 wherein said anode means has masking insulation positioned in a patterned design thereon that defines alternative masked and exposed metal surface areas on its planar opposed wide face portions.

5. A battery as defined in claim 4 wherein said metal wool has fibers in a high density relation under high contact pressure between said pair of inner and outer planar wide face portions of each of said cathodes.

6. A battery as defined in claim 1 wherein, the said cathodes are in the form of two opposed pairs defining a box-like enclosure about said anode means, means secures said opposed pairs in an electrically connected relationship, said anode means has two pairs of substantially planar opposed wide face portions and is secured in a substantially central position within the box-like enclosure and with each of its said face portions in a substantially parallel spaced-apart relation with respect to an associated one of the inner planar wide face portions of said cathodes.

7. A galvanic battery as defined in claim 1 wherein, said metal wool has steel fibers in a high density relation between said pair of inner and outer planar wide face portions of each of said electrodes, each wide face portion of said electrodes is of expanded metal construction with spaced-apart holes therein, there are two pairs of electrodes of the defined construction with the electrodes of each pair in a transversely opposed spaced-apart relation with respect to each other, angle pieces are employed to securely connect the opposed pairs of electrodes in a box-like vertically extending open-end construction, and said anode means has four substantially planar face portions each of which is in a spaced-apart and opposed relation with respect to an inner wide face portion of an associated one of said electrodes.

* * * * *

UNITED STATES PATENT OFFICE
CERTIFICATE OF CORRECTION

PATENT NO. : 3,907,596
DATED : September 23, 1975
INVENTOR(S) : Albert E. Ketler, Jr.

It is certified that error appears in the above-identified patent and that said Letters Patent are hereby corrected as shown below:

Column 2, line 60 delete "233", second instance.

Signed and Sealed this twenty-ninth Day of June 1976

[SEAL]

Attest:

RUTH C. MASON
Attesting Officer

C. MARSHALL DANN
Commissioner of Patents and Trademarks